United States Patent
Matt

(10) Patent No.: US 11,117,457 B2
(45) Date of Patent: Sep. 14, 2021

(54) AXLE DRIVE UNIT COMPRISING A BRAKE SYSTEM, DRIVE AXLE AND MOTOR VEHICLE

(71) Applicant: JHEECO E-DRIVE AG, St. Gallen (CH)

(72) Inventor: Philipp Matt, Frastanz (AT)

(73) Assignee: JHEECO E-DRIVE AG, Eschen (LI)

( * ) Notice: Subject to any disclaimer, the term of this patent is extended or adjusted under 35 U.S.C. 154(b) by 122 days.

(21) Appl. No.: 16/486,730

(22) PCT Filed: Feb. 16, 2018

(86) PCT No.: PCT/EP2018/053956
§ 371 (c)(1),
(2) Date: Aug. 16, 2019

(87) PCT Pub. No.: WO2018/150008
PCT Pub. Date: Aug. 23, 2018

(65) Prior Publication Data
US 2019/0375283 A1    Dec. 12, 2019

(30) Foreign Application Priority Data

Feb. 20, 2017  (DE) ..................... 10 2017 103 397.1
Feb. 20, 2017  (DE) ..................... 10 2017 103 399.8
(Continued)

(51) Int. Cl.
*B60K 1/04*     (2019.01)
*B60K 1/00*     (2006.01)
(Continued)

(52) U.S. Cl.
CPC ............. *B60K 1/00* (2013.01); *B60K 1/04* (2013.01); *B60K 7/0007* (2013.01); *B60L 53/24* (2019.02);
(Continued)

(58) Field of Classification Search
CPC .......... B60K 1/00; B60K 1/04; B60K 7/0007; B60K 11/02; B60K 17/043;
(Continued)

(56) References Cited

U.S. PATENT DOCUMENTS 5,412,304 A    5/1995  Abbott
9,022,168 B2   5/2015  Hayman
(Continued)

FOREIGN PATENT DOCUMENTS

DE    694 02 635 T    11/1997
DE    10219921 A      11/2003
(Continued)

OTHER PUBLICATIONS

Machine translation of WO 2013/106049 A1 obtained from www.espacenet.com on Feb. 13, 2021. (Year: 2013).*
(Continued)

*Primary Examiner* — James A Shriver, II
*Assistant Examiner* — Hilary L Johns
(74) *Attorney, Agent, or Firm* — Calfee, Halter & Griswold LLP

(57) ABSTRACT

An axle drive unit may be employed by an electrically-driven motor vehicle having at least one drive axle. The axle drive unit may include at least one electric motor for generating a drive torque and at least one gearing (or transmission) for transmitting the drive torque to the drive axle. The electric motor and the gearing may form a structural unit. The axle drive unit allows a drive train of a motor vehicle to have the simplest, weight-saving construction possible. To achieve this, power electronics and an electromechanical service brake system may be integrated into the structural unit. The electromechanical service brake system may be configured as an inboard service brake system for transmitting braking power to the drive axle.

20 Claims, 2 Drawing Sheets

(30) Foreign Application Priority Data

Feb. 20, 2017 (DE) .................... 10 2017 103 400.5
Feb. 20, 2017 (DE) .................... 10 2017 103 401.3

(51) Int. Cl.

| | | |
|---|---|---|
| B60K 7/00 | (2006.01) | |
| H02K 11/33 | (2016.01) | |
| H02J 50/10 | (2016.01) | |
| B60L 53/24 | (2019.01) | |
| H02J 7/02 | (2016.01) | |
| H02K 7/00 | (2006.01) | |
| H02K 7/116 | (2006.01) | |
| H02K 9/19 | (2006.01) | |
| H02K 11/00 | (2016.01) | |
| B60K 11/02 | (2006.01) | |
| B60K 17/04 | (2006.01) | |

(52) U.S. Cl.

CPC .............. *H02J 7/025* (2013.01); *H02J 50/10* (2016.02); *H02K 7/006* (2013.01); *H02K 7/116* (2013.01); *H02K 9/19* (2013.01); *H02K 11/0094* (2013.01); *H02K 11/33* (2016.01); *B60K 11/02* (2013.01); *B60K 17/043* (2013.01); *B60K 2001/001* (2013.01); *B60K 2007/0046* (2013.01); *B60K 2007/0092* (2013.01); *B60L 2210/10* (2013.01); *B60Y 2410/10* (2013.01)

(58) Field of Classification Search

CPC ...... B60K 2001/001; B60K 2007/0046; B60K 2007/0092; H02K 11/33; H02K 7/006; H02K 7/116; H02K 9/19; H02K 11/0094; H02K 11/022; H02J 50/10; H02J 7/025; B60L 53/24; B60L 2210/10; B60Y 2410/10
USPC ........................................................ 180/68.5
See application file for complete search history.

(56) References Cited

U.S. PATENT DOCUMENTS

| | | | |
|---|---|---|---|
| 2003/0230443 A1* | 12/2003 | Cramer | B60G 3/20 |
| | | | 180/65.51 |
| 2007/0213160 A1 | 9/2007 | Lyons | |
| 2013/0249477 A1 | 9/2013 | Keeling | |
| 2013/0281247 A1 | 10/2013 | Holmes | |
| 2016/0003337 A1 | 1/2016 | Smetana | |
| 2016/0039277 A1 | 2/2016 | Falls | |
| 2016/0159227 A1 | 6/2016 | Lochner | |
| 2016/0297306 A1 | 10/2016 | Herzog | |
| 2017/0210244 A1 | 7/2017 | Isono | |

FOREIGN PATENT DOCUMENTS

| | | | | |
|---|---|---|---|---|
| DE | 10219921 A1 * | 11/2003 | ............... | B60K 1/00 |
| DE | 103 38 659 A | 3/2005 | | |
| DE | 102007000653 A | 5/2009 | | |
| DE | 10 2009 015 414 A | 9/2010 | | |
| DE | 20 2011 002 194 U | 4/2011 | | |
| DE | 102010008230 A | 8/2011 | | |
| DE | 10 2010 017 991 A | 10/2011 | | |
| DE | 102010017991 A1 * | 10/2011 | ............... | B60G 3/20 |
| DE | 10 2010 020 576 A | 11/2011 | | |
| DE | 10 2011 001 481 A | 6/2012 | | |
| DE | 10 2012 208 927 A | 12/2013 | | |
| DE | 10 2012 112 377 A | 6/2014 | | |
| DE | 10 2012 025 371 A | 7/2014 | | |
| DE | 10 2013 100 957 A | 7/2014 | | |
| DE | 20 2014 004 853 U | 7/2014 | | |
| DE | 102012025371 A1 * | 7/2014 | ............... | B60K 1/00 |
| DE | 10 2013 012 477 A | 1/2015 | | |
| DE | 10 2013 214 311 A | 1/2015 | | |
| DE | 10 2013 226 830 A | 6/2015 | | |
| DE | 10 2014 203 037 A | 8/2015 | | |
| DE | 10 2014 018 753 A | 6/2016 | | |
| DE | 10 2015 206 365 A | 10/2016 | | |
| DE | 10 2015 208 834 A | 12/2016 | | |
| DE | 10 2015 212 811 A | 1/2017 | | |
| EP | 1 503 481 A | 2/2005 | | |
| EP | 2 258 569 A | 12/2010 | | |
| EP | 2 546 092 A | 1/2013 | | |
| EP | 2765018 A | 8/2014 | | |
| EP | 2849314 A | 3/2015 | | |
| KR | 20090123063 A | 12/2009 | | |
| KR | 20150142652 A | 12/2015 | | |
| WO | 99/36286 A | 7/1999 | | |
| WO | WO-9936286 A1 * | 7/1999 | ............ | B60L 15/2036 |
| WO | 2011/076534 A | 6/2011 | | |
| WO | 2013/106049 A | 7/2013 | | |
| WO | WO-2013106049 A1 * | 7/2013 | ............... | B60L 50/64 |
| WO | 2016055873 A | 4/2016 | | |
| WO | 2016/116104 A | 7/2016 | | |

OTHER PUBLICATIONS

Machine translation of DE 102012025371 A1 obtained from www.espacenet.com on Feb. 14, 2021. (Year: 2014).*

Machine translation of DE 10219921 A1 obtained from www.espacenet.com on Feb. 14, 2021. (Year: 2003).*

English Translation of International Search Report issued in PCT/EP2018/053956, dated Jul. 17, 2018.

Anwendungsrichtlinie VDE, Mar. 2011, VDE AR 2122-4.

* cited by examiner

AXLE DRIVE UNIT COMPRISING A BRAKE SYSTEM, DRIVE AXLE AND MOTOR VEHICLE

CROSS REFERENCE TO RELATED APPLICATIONS

This application is a U.S. National Stage Entry of International Patent Application Serial Number PCT/EP2018/053956, filed Feb. 16, 2018, which claims priority to (i) German Patent Application No. DE 10 2017 103 397.1, filed Feb. 20, 2017; (ii) German Patent Application No. DE 10 2017 103 399.8, filed Feb. 20, 2017; (iii) German Patent Application No. DE 10 2017 103 400.5, filed Feb. 20, 2017; and (iv) German Patent Application No. DE 10 2017 103 401.3, filed Feb. 20, 2017, the entire contents all of which are incorporated herein by reference.

FIELD

The present disclosure generally relates to axle drives for vehicles.

BACKGROUND

With a view to future mobility requirements, considerable technological changes are facing the automotive industry in connection with the electrification of the traction drive. Precisely the legal conditions for limiting the pollutant emissions and the $CO_2$ emission require new designs. For example, from 2021, passenger motor vehicles in Europe will be allowed to emit on average only 95 g $CO_2$/km. The increasing electrification of the drive train plays an important role in maintaining this limit and also in maintaining other emission limits.

WO 2016/116104 A1, stated at the outset, discloses an axle drive unit having an electric motor and a gearing. In this known axle drive unit, the gearing is intended to improve the shifting comfort and efficiency of the unit. For this purpose, the gearing has two shifting stages with an intermediate gearing which has an infinitely variable transmission. In addition, the known axle drive unit comprises an integrated electromechanical parking lock. The intermediate gearing makes the known axle drive unit structurally complicated and relatively heavy, with the result that the weight of the drive train is increased.

Thus a need exists for an axle drive unit that allows the drive train of a motor vehicle to have the simplest, weight-saving construction possible.

DETAILED DESCRIPTION

Figure 1:
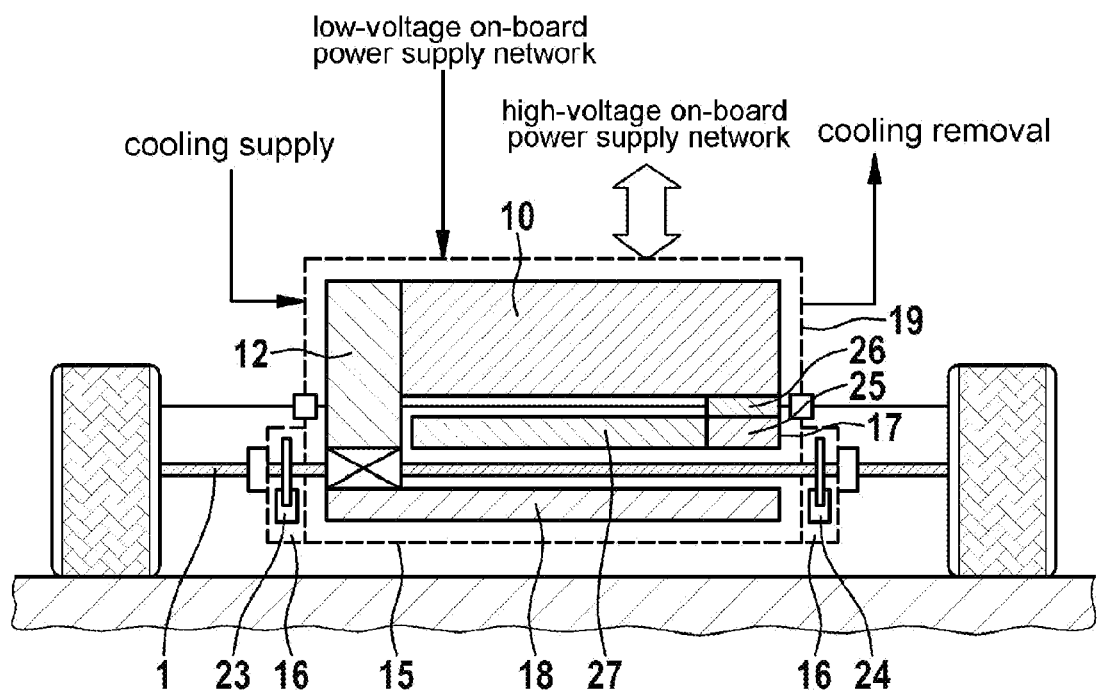
FIG. 1 is a cross-sectional view of an example axle drive unit with a single electric motor as traction motor.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention is based on the concept of providing an axle drive unit for an electrically drivable motor vehicle which comprises at least one drive axle. The axle drive unit comprises at least one electric motor for generating a drive torque and at least one gearing for transmitting the drive torque to the drive axle. The electric motor and the gearing form a structural unit. The invention is distinguished by the fact that a power electronics unit and an electromechanical service brake system are integrated into the structural unit. The service brake system is designed as an inboard service brake system for transmitting a braking force to the driver axle.

Within the context of the invention, the power electronics unit is integrated, in addition to the electric motor and the gearing, into the structural unit built up from these components, that is to say into one and the same structural unit. Moreover, in addition to the power electronics unit, an electromechanical service brake system in the form of an inboard service brake system is integrated as further component into the structural unit. The structural unit forms a physical unit in which the aforementioned components are combined as a subassembly. The structural unit can be handled as a whole, for example can be assembled as a whole during assembly of the drive axle. In the installed state, the structural unit forms the interface to other components of the motor vehicle which are arranged outside the structural unit and with which the individual components of the structural unit interact, for example a traction battery of the motor vehicle or a generator.

In addition to electric motor, gearing and power electronics unit, a component which is responsible, with the service brake system, for the longitudinal dynamics and possibly also for the transverse dynamics of the motor vehicle is integrated into the structural unit. The integration of the service brake system into one and the same structural unit with the electric motor, the gearing and the power electronics unit ensures a high functional and physical integration of the relevant longitudinal and possibly transverse dynamics components into a central unit.

The integration of the aforementioned components into the structural unit contributes to the drive train being able to be optimized overall, for example in terms of the weight of the axle drive unit, since the periphery of these components can be optimally configured by the common, central use of already existing components. In addition, the integration of the components into one and the same structural unit allows a reduction in the number of holding points by which said components are fastened in the chassis, with the result that assembly is simplified.

It generally holds that the service brake system makes it possible, with a graduated or variable action, to reduce the speed of the motor vehicle during operation, in particular until the vehicle comes to a standstill. By contrast thereto, a parking lock or parking brake only allows the motor vehicle to be halted even on an inclined roadway.

In the case of the inboard brake system, the braking forces are, by contrast to an outboard brake, not introduced directly into the wheels but at a distance from the wheels, that is to say in the region of the drive axle (inboard). This has the advantage that the wheel suspension is relieved of the weight of the brake system.

A further significant advantage of the integration of the electromechanical service brake system into the structural unit consists in the fact that the service brake system is cooled by the device for cooling liquid supply already present for the electric motor. The usually decisive advantage of the air cooling for the outboard brake is thus dispensed with. A further advantage of the integration of the service brake system into the structural unit consists in the fact that the service brake system can be encapsulated, with the result that the abrasion caused during braking does not contaminate the rims and does not contribute to fine dust loading.

In summary, the invention allows a highly integrated, electric drive axle in which the axle drive unit contains the aforementioned components as integral constituent parts in addition to the known components, i.e. electric motor and gearing. The integration in a structural unit of the components, which are installed separately in the prior art, allows the realization of synergy effects which lead to a simple and lightweight construction of the drive train. The specific implementation of the synergy effects is the subject matter of the preferred embodiments of the invention.

The invention is suitable for all motor vehicles, i.e. for example passenger motor vehicles or commercial motor vehicles, in which an electric drive axle is installed. The invention is particularly well suited to exclusively battery-operated vehicles. The latter can be equipped with or without range extenders. The invention can also be used for hybrid vehicles which have an electrified drive axle.

It is possible to use the axle drive unit according to the invention in an electrified front axle and/or in an electrified rear axle.

Within the scope of the invention, the axle drive unit is claimed independently of the drive axle. Additionally claimed is the combination of the drive axle with the axle drive unit according to the invention and a motor vehicle which contains the axle drive unit according to the invention.

Preferred embodiments of the invention are specified in the dependent claims.

The drive torque is preferably transmitted by in each case one axle drive unit to at least two drive shafts, also termed drive axles, in order to drive wheels of the motor vehicle.

Precisely one axle drive unit is particularly preferably provided for in each case two drive axles.

Here, it is particularly to be preferred if, as viewed with respect to the axle drive unit, the two axles are arranged on opposite sides of the axle drive unit. In other words, in each case a right and a left wheel of the motor vehicle is driven and, if correspondingly integrated, also steered by the axle drive unit.

In a particularly preferred embodiment, the structural unit comprises a common housing. This has the advantage that the housing can be designed as a multifunctional component which centrally performs different functions, such as, for example, cooling or coupling to an energy supply, for the components arranged in the housing. Likewise, the power electronics unit, on the one hand, and an electromechanical service brake system and/or an electromechanical steering system and/or an inductive charging receiver for a battery system, on the other hand, just like elements thereof, such as, for example brakes of the service brake system, can be built and/or flanged on/in the structural unit and/or the housing.

The service brake system can comprise at least one service brake with at least one mechanical braking element for the transmission of the braking force and at least one electrically actuatable actuator for the braking element. The service brake can be configured for example as a friction brake, in particular as a wedge brake. The invention is not limited to wedge brakes but also encompasses other electromechanically actuatable service brakes.

In a further preferred embodiment, the electric motor and the service brake system are in each case liquid-cooled. The housing comprises a device for supplying cooling liquid to the electric motor and to the service brake system. The integration of the aforementioned components into a structural unit offers the possibility of a central cooling liquid supply, with the result that the cooling liquid supply required for the electric motor is also made usable for other components, such as the service brake system. This is particularly advantageous because the cooling water feed of the electric motor is generally about 65° C.

The housing preferably comprises connections for the connection of the device for cooling liquid supply to an external cooling liquid circuit. Additionally or alternatively, the housing can comprise an internal cooling liquid circuit. In the first variant, the heat absorbed by the cooling liquid is removed outside the structural unit. For this purpose, the cooling liquid is channeled in from outside and channeled off again to the outside after the cooling liquid has passed through the components to be cooled. In the second variant, what is concerned is a closed cooling liquid circuit within the structural unit. This has the advantage that the structural unit can be encapsulated, in particular the service brake system, with the result that contamination of the rims cause by brake abrasion and fine dust loading are practically eliminated.

In a further preferred embodiment, the power electronics unit is designed for controlling or supplying energy to the electric motor and for controlling or supplying energy to the electromechanical service brake system. The central use of the power electronics unit for the common control or energy supply of a plurality of components in the structural unit forms the prerequisite for improved control performance, since the control of the different components of the structural unit, for example the electric motor and the service brake system, can be tailored to one another (blending). During braking in conjunction with an electrified drive train, consideration should be taken of the possibility of recuperation in which the braking power is used to drive the electric motor in order to use the latter as a generator. The traction battery or a low-voltage battery is charged with the thus generated electric energy. The distribution of the braking force to the electromechanical service brake system and to the electric motor acting as generator is referred to as blending.

The power electronics unit preferably comprises a high-voltage/low-voltage DC/DC converter for the additional low-voltage supply of the service brake system. Alternatively, the structural unit and/or the power electronics unit can comprise electrical connections for at least 2 low-voltage voltage generators (for example of 12 volts) for the low-voltage energy supply of the service brake system. In both embodiments, a redundant energy supply of the service brake system is provided.

In a preferred embodiment, the service brake system and the electric motor can be selectively or simultaneously activated to decelerate the motor vehicle. As described above, the electric motor can be operated as a generator for recuperation of the braking energy. The electric motor/generator thus acts as a permanent brake system. By virtue of the integrated drive control kit, the vehicle deceleration controller selectively brings the electric motor and/or the electromechanical brake into use in dependence on the predetermined command variable and the operating state of the electrified drive axle.

The service brake system is preferably encapsulated in the housing. This has the advantage that the abrasion resulting during braking cannot be distributed either outwardly into the surroundings nor in an uncontrolled manner in the housing. For a further preference, the service brake system is arranged in a particle collector of the housing. The maintenance of the service brake system is simplified by the interchangeability of the particle collector.

The service brake system can be arranged at the output of the gearing, with the result that a favorable introduction of the braking force or of the braking torque is achieved.

The service brake system preferably comprises two service brakes which are designed for transmitting wheel-specific braking torques to the drive axle. A redundant safety system is thereby created for the case that one of the two service brake fails. In addition, by virtue of the transmission of wheel-specific braking torques, the two service brakes can be used for the distribution of the driving torques to the different wheels (torque vectoring).

Furthermore, it is advantageous if the structural unit comprises a central motor with gearing and corresponding differential, and the service brake system comprises wheel-specific inboard brakes for the use of torque vectoring.

For drive torque distribution, use can be made either of a differential gearing or of a split drive axle.

The service brakes can be arranged in the longitudinal direction of the drive axle on both sides of the structural unit, with the result that the assignment of the service brakes to the respective wheel is achieved while maintaining the principle of the inboard brake.

The service brake system can be adapted as a parking brake and/or as an emergency brake. In addition to the main function of the service brake system, the function as a parking brake can consist in causing a graduatable or variable deceleration of the motor vehicle.

The axle drive unit according to FIG. 1 can be combined with the front axle and/or the rear axle of a motor vehicle. The same applies to the other exemplary embodiments. The axle drive unit is suitable for all motor vehicles, i.e. for example passenger motor vehicles or commercial motor vehicles, in which an electric drive axle is installed. The axle drive unit is suited particularly well, but not exclusively, for purely battery-operated vehicles. The axle drive unit can also be used for hybrid vehicles which have an electrified drive axle.

The axle drive unit according to FIG. 1 has a structural unit 15 into which different at least partially electric components are integrated. The components integrated into the structural unit 15 form a subassembly which mounted as a unit and interact with other components of the motor vehicle arranged outside the structural unit 15. For this purpose, the structural unit 15 comprises a common housing 19 in which the components belonging to the structural unit 15 are arranged or to which components of the structural unit 15 are fastened. It is thus possible that the components of the structural unit 19 are arranged both in the housing 19 and on the housing 19, i.e. on the outside of the housing 19.

The housing 19 is designed as a multifunctional housing which not only mechanically and thermally protects the components arranged therein but also allows the coupling of the components to devices and components of the motor vehicle situated outside the housing. For this purpose, the housing 19 comprises various devices, such as, for example, a cooling device or the power electronics unit 27, which are used centrally by the components arranged in or on the housing. Further functionalities of the housing 19 are possible.

The housing 19 is closed and heat-insulated for thermal management.

The structural unit 15 according to FIG. 1 comprises a single electric motor 10 as traction motor which generates the drive torque required for moving the motor vehicle. The drive torque generated by the electric motor 10 is stepped up by a gearing 12 and transmitted to the drive axle 1. The electric motor 10 and the gearing 12 are correspondingly connected to one another.

The electric motor 10 can be an asynchronous motor or a permanently excited synchronous motor. This applies to all the electric motors described within the context of the invention and to the associated exemplary embodiments.

The structural unit 15 comprises an electromechanical service brake system 16 which is arranged in the housing 19. The electromechanical service brake system 16 is controlled by an electric signal of the control signal transmission which is triggered for example by actuating the brake pedal or another actuating device. Here, the braking action can be changed by the vehicle driver during the driving mode. As a result, an electric output signal or actuating signal is generated which controls the mechanical components of the service brake system 16, for example the brake shoes or the brake wedge of a friction brake, with the result that the braking forces are transmitted to the drive axle. Specifically, the service brake system 16 comprises two service brakes 23, 24 which are arranged at a distance from the wheels in the longitudinal direction of the drive axle 1. The service brake system 16 is accordingly an inboard service brake system in which the braking forces are transmitted to the drive axle 1. Each service brake 23, 24 comprises an electrically actuatable actuator which exerts an actuating force on the respective mechanical braking elements and thus generates the desired braking forces.

As a possible, but not exclusive, example, the service brake can be configured in the form of a wedge brake. Here, the electrically actuatable actuator comprises an electric motor and a brake wedge which can be moved by the electric motor in two opposite directions, that is to say back and forth. The braking element is designed as a brake lining or brake pad which is pressed by the oblique surface of the brake wedge against a counterpiece, for example a brake disk which is connected to a wheel drive shaft of the drive axle in a rotationally fixed manner. As soon as the brake pad contacts the brake disk, the self-boosting effect of the wedge principle comes into play.

The two service brakes 23, 24 are designed as redundant safety systems for the case that one of the two service brakes 23, 24 fails. In addition, the two service brakes 23, 24 can be activated wheel-specifically such that, as a result of different braking forces on the wheels, the driving torques acting there can be changed wheel-specifically. In addition, torque vectoring is therefore possible or able to be assisted. For this purpose, the axle drive unit can comprise a differential gearing (see FIG. 1, reference sign 1, arrow in clockwise direction) or can be able to be connected or be connected to a split drive axle 1 (see FIG. 2).

The two service brakes 23, 24 are encapsulated in the housing 19, which thus acts as a particle collector. Contamination of the rims by brake abrasion and fine dust loading is thus reduced. Nor can the brake abrasion be distributed in the housing 19, because the service brakes 23, 24 are also encapsulated inwardly, that is to say toward the housing 19.

The structural unit 15 according to FIG. 1 also comprises a steering system 17 with an electric motor 25. The electric motor 25 is mechanically connected to the wheels of the drive axle 1 by a steering gear 26 and a linkage.

The steering system 17 is preferably, but not exclusively, a steer-by-wire steering system, that is to say a steering system in which the steering wheel and the steering gear 26 are mechanically decoupled. The steering movement introduced into the steering wheel by the driver is detected by sensor. The sensor signal is processed in a controller which transmits an actuating signal to an actuating drive to set the desired steering angle of a steered wheel. The actuating drive can be the aforementioned electric motor 25 of the steering system 17. In order to simulate the actuating forces and reaction forces required for safe driving, a manual torque is introduced into the steering wheel by a further actuating member. By virtue of the mechanical decoupling of the steering wheel from the steering gear 26, it is possible to carry out automatic steering corrections or to realize autonomous driving without the steering wheel being moved for this purpose. The steer-by-wire steering system is an electromechanical steering system, since the steering torque generated by the electric motor 25 is transmitted to the wheels by a mechanical steering gear 26, for example a rack gear or a ball screw drive.

The electric motor 25 can also be designed as an auxiliary motor for assisting a mechanically generated steering torque. The steering system can be a steering-knuckle steering system or an individual-wheel steering system. The steering-knuckle steering system is preferable for the implementation of the drive torque distribution.

The mechanical components of the steering system 17 can be fastened, in particular flanged, to the outside of the housing 19. The mechanical components of the steering system 17 can be arranged on the housing 19 to the front or rear in the direction of travel. As a result, the respective installation position of the axle drive unit is taken into consideration. The electric motor 15 is arranged in the housing 19, with the result that the cooling and electrical activation of the electric motor 15 is facilitated.

In the lower region of the housing 19 there is arranged an inductive charging receiver 18 by means of which the traction battery can be charged during operation of the axle drive unit.

The following components of the structural unit are used centrally by the above-described components.

Integrated into the structural unit 15 is a power electronics unit 27 which controls the electric motor 10 and at least one further component of the structural unit 15. The power electronics unit 27 is responsible for transforming direct current into alternating current, or vice versa, and for controlling the power flows. Such devices are known in the prior art and do not need to be described in further detail. In the example according to FIG. 1, the power electronics unit 27 is additionally used to activate the steering system 17, the service brake system 16 and the inductive charging receiver 18. This has the advantage that the power control of the individual components, for example the electric motor and the service brake system 16, can be tailored (blending). In addition, the power electronics unit 27 can be concomitantly cooled centrally by the device for cooling liquid supply that is provided for the electric motor 10.

Besides the liquid-cooled electric motor 10, the device for cooling liquid supply (not shown) supplies further components of the structural unit 15 with cooling liquid, such as, for example, the service brake system 16, the electric motor 25, the steering system 17 and the charging receiver 18. The device for cooling liquid supply can, as illustrated in FIG. 1, comprise connections for the supply of the cooling liquid or the removal of the cooling liquid. The device for cooling liquid supply according to FIG. 1 can accordingly be connected to an external cooling liquid circuit. Alternatively, use can be made of a closed internal cooling liquid circuit which cools components arranged in the housing 19.

It is further illustrated in FIG. 1 that the housing 19 has connections for connection to a low-voltage on-board power supply network and a high-voltage on-board power supply network.

Figure 2:
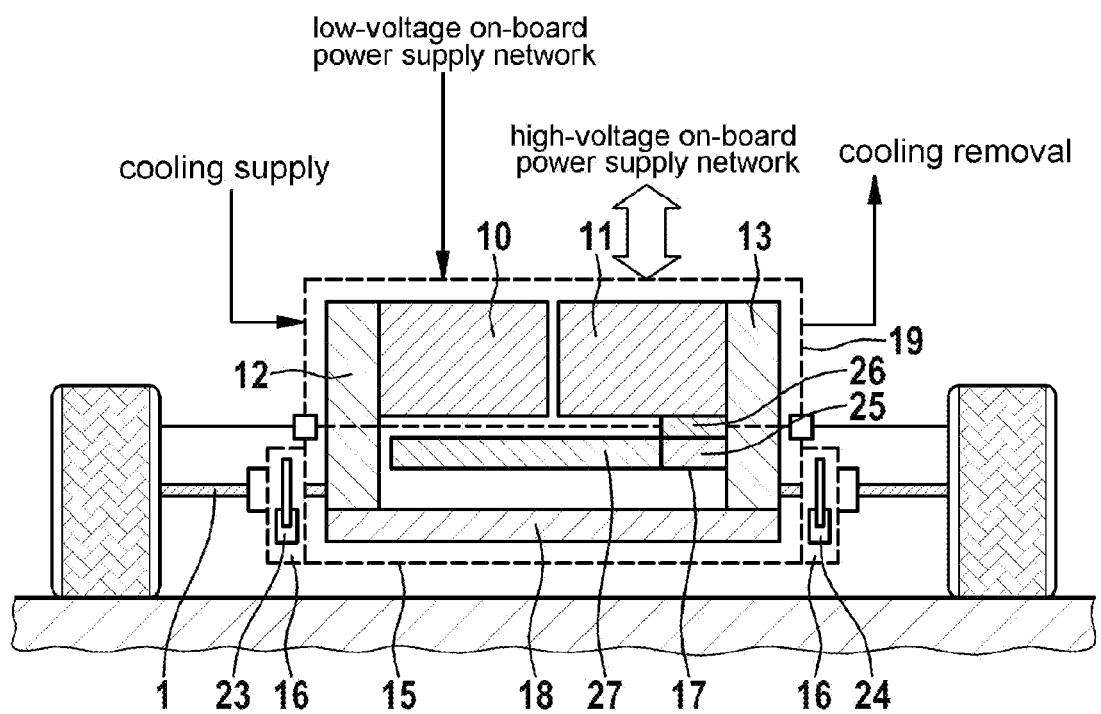
FIG. 2 is a cross-sectional view of another example axle drive unit with two electric motors as traction motors.

The exemplary embodiment according to FIG. 2 differs from the exemplary embodiment according to FIG. 1 in that, instead of the single electric motor 10, two separate electric motors 10, 11 (first and second electric motors 10, 11) are arranged as traction motors. To transmit wheel-specific drive torques by means of the two electric motors 10, 11, the drive axle 1 is split into two axle portions, wherein in each case an electric motor 10, 11 is connected to an axle portion by corresponding gearings 12, 13 (first and second gearings 12, 13). Alternatively, a differential gearing can be arranged between the two electric motors 10, 11.

As for the rest, reference is made to the statements in conjunction with the axle drive unit according to FIG. 1.

Figure 3:
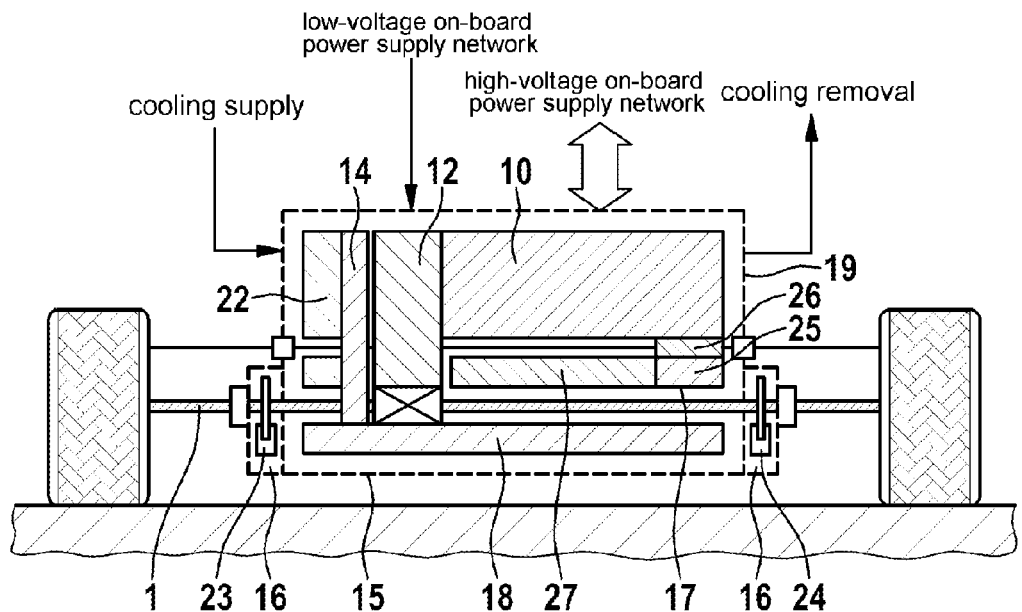
FIG. 3 is a cross-sectional view of yet another example axle drive unit with an auxiliary electric motor for distributing an axle drive torque.

The axle drive unit according to FIG. 3 is likewise suitable for transmitting different drive torques to the two wheels. The axle drive unit according to FIG. 3 comprises a single electric motor 10 as traction motor. The latter is connected to the drive axle 1 by the gearing 12, which is designed as a differential gearing. The differential gearing 12 produces a power splitting for transmitting different drive torques to the two wheels. The drive torque distribution is achieved by an auxiliary electric motor 22 (third electric motor) which is mechanically connected to the drive axle 1 by an additional (third) gearing 14. The drive torque applied by the electric motor 10 can be superimposed by the auxiliary electric motor 22, with the result that different drive torques can be applied to both wheels. The additional electric motor 22 and the associated third gearing 14 are accommodated in the housing 19 and are cooled by the central device for cooling liquid supply and supplied with energy by the central power electronics unit 27. As regards the rest of the components of the structural unit 15, reference is made to the statements pertaining to FIG. 1.

Figure 4:
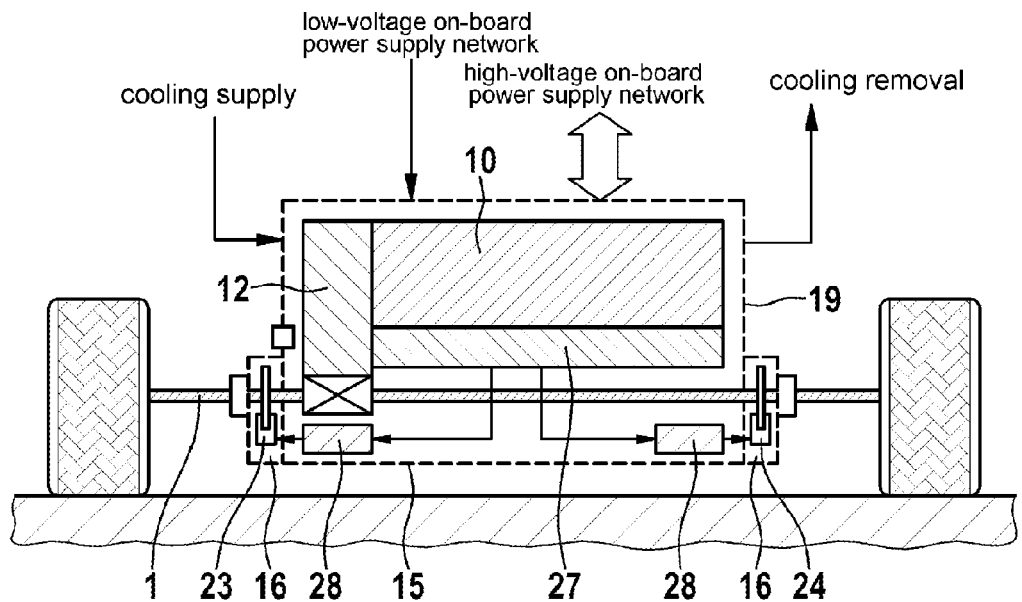
FIG. 4 is a cross-sectional view of still another example axle drive unit having two independent low-voltage current sources for controlling a brake system in each case.

The axle drive unit according to FIG. 4 is constructed similarly to the axle drive unit according to FIG. 1, wherein the service brake system 16, in particular the first and the second service brake 23, 24, is/are electrically supplied and controlled by in each case a low-voltage current source 28. The two low-voltage current sources 28 are independent of one another and are supplied with energy via the power electronics unit 27 from a battery system or via a direct-voltage converter of the power electronics unit 27 that transforms down the voltage from the high-voltage on-board power supply network.

In all the exemplary embodiments, the service brakes 23, 24 can be combined with the first and second electric motors 10, 11 acting as traction motors or with the single electric motor 10 and the auxiliary electric motor (third electric motor) in such a way that the service brake system 16 assists the drive torque distribution to the wheels. The electric motor 25 of the steering system 17 can be referred to as fourth electric motor.

The drive torque is preferably transmitted by in each case one structural unit 15 to at least two drive axles 1, also termed drive shafts, in order to drive wheels of the motor vehicle.

Precisely one structural unit 15 is particularly preferably provided for in each case two drive axles 1.

Here, it is particularly to be preferred if, as seen with respect to the structural unit 15, the two axles 1 are arranged on opposite sides of the structural unit 15. In other words, in each case a right and a left wheel of the motor vehicle are driven and, if correspondingly integrated, also steered by the structural unit 15.

LIST OF REFERENCE SIGNS

1 Drive axle
10 First electric motor (traction motor)
11 Second electric motor (traction motor)
12 First gearing
13 Second gearing
14 Third gearing
15 Structural unit
16 Service brake system
17 Steering system
18 Charging receiver
19 Housing
20 Free
21 Free
22 Third electric motor (auxiliary electric motor for torque vectoring)
23 First service brake
24 Second service brake
25 Fourth electric motor (steering system)
26 Steering gear (steering system)
27 Power electronics unit
28 Low-voltage current source (for service brake system)

What is claimed is:

1. An axle drive unit for an electrically-drivable motor vehicle that has a drive axle, the axle drive unit comprising:
an electric motor for generating a drive torque;
a gearing for transmitting the drive torque to the drive axle, wherein the electric motor and the gearing form a structural unit;
a power electronics unit integrated into the structural unit; and
an electromechanical service brake system integrated into the structural unit, wherein the electromechanical service brake system is configured as an inboard service brake system for transmitting a braking force to the drive axle, wherein the electromechanical service brake system is disposed in a particle collector of a common housing of the structural unit.

2. The axle drive unit of claim 1 wherein the structural unit comprises a common housing.

3. The axle drive unit of claim 1 wherein the electromechanical service brake system comprises a service brake with a mechanical braking element for transmitting the braking force and an electrically actuatable actuator for the mechanical braking element.

4. The axle drive unit of claim 1 wherein the electric motor and the electromechanical service brake system are liquid-cooled, wherein a common housing of the structural unit comprises a device for supplying cooling liquid to the electric motor and to the electromechanical service brake system.

5. The axle drive unit of claim 4 wherein the common housing comprises a connection that connects the device for supplying cooling liquid to a cooling liquid circuit.

6. The axle drive unit of claim 1 wherein the power electronics unit is configured to control the electric motor and the electromechanical service brake system.

7. The axle drive unit of claim 6 wherein the power electronics unit comprises at least one of a high-voltage/low-voltage DC/DC converter or two separate 12V connections for a low-voltage energy supply of the electromechanical service brake system.

8. The axle drive unit of claim 1 wherein the structural unit comprises electrical connections for at least two low-voltage voltage generators for a low-voltage energy supply of the electromechanical service brake system.

9. The axle drive unit of claim 1 wherein the electromechanical service brake system and the electric motor are activatable selectively or simultaneously to decelerate the electrically-drivable motor vehicle.

10. The axle drive unit of claim 1 wherein the electromechanical service brake system is disposed at an output of the gearing.

11. The axle drive unit of claim 1 wherein the electromechanical service brake system comprises two service brakes that are configured to transmit wheel-specific braking torques to the drive axle.

12. The axle drive unit of claim 11 wherein the two service brakes are disposed in a longitudinal direction of the drive axle on both sides of the structural unit.

13. The axle drive unit of claim 1 wherein the electromechanical service brake system is configured as at least one of a parking brake or an emergency brake.

14. The axle drive unit of claim 1 wherein the structural unit comprises a central motor with gearing and a corresponding differential, wherein the electromechanical service brake system comprises wheel-specific inboard brakes for torque vectoring.

15. A drive axle for a motor vehicle having an axle drive unit according to claim 1.

16. A motor vehicle having an axle drive unit according to claim 1.

17. An axle drive unit for an electrically-drivable motor vehicle that has a drive axle, the axle drive unit comprising:
an electric motor for generating a drive torque;
a gearing for transmitting the drive torque to the drive axle, wherein the electric motor and the gearing form a structural unit;
a power electronics unit integrated into the structural unit; and
an electromechanical service brake system integrated into the structural unit, wherein the electromechanical service brake system is configured as an inboard service brake system for transmitting a braking force to the drive axle, wherein the electric motor and the electromechanical service brake system are liquid-cooled, wherein a common housing of the structural unit comprises a device for supplying cooling liquid to the electric motor and to the electromechanical service brake system.

18. A drive axle for a motor vehicle having an axle drive unit according to claim 17.

19. The axle drive unit of claim 18 wherein the electromechanical service brake system is encapsulated in a common housing of the structural unit.

20. A motor vehicle having an axle drive unit according to claim 17.

* * * * *